(12) United States Patent
Ju et al.

(10) Patent No.: US 11,662,517 B2
(45) Date of Patent: May 30, 2023

(54) LAMP AND LAMP SYSTEM

(71) Applicant: Radiant Opto-Electronics Corporation, Kaohsiung (TW)

(72) Inventors: Chih-Hung Ju, Kaohsiung (TW); Cheng-Ang Chang, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 17/931,542

(22) Filed: Sep. 12, 2022

(65) Prior Publication Data
US 2023/0119667 A1 Apr. 20, 2023

Related U.S. Application Data

(63) Continuation of application No. PCT/CN2021/124966, filed on Oct. 20, 2021.

(51) Int. Cl.
*F21V 8/00* (2006.01)

(52) U.S. Cl.
CPC .......... *G02B 6/0086* (2013.01); *G02B 6/0045* (2013.01); *G02B 6/0073* (2013.01)

(58) Field of Classification Search
CPC ... G02B 6/0086; G02B 6/0045; G02B 6/0073
See application file for complete search history.

(56) References Cited

U.S. PATENT DOCUMENTS

| | | | | |
|---|---|---|---|---|
| 7,540,627 | B2* | 6/2009 | Handsaker | F21S 4/00 362/225 |
| 8,721,152 | B2* | 5/2014 | Coleman | F21S 8/06 362/555 |
| 9,494,305 | B2* | 11/2016 | Tischler | F21L 4/00 |
| 10,605,414 | B1* | 3/2020 | Garrett | F21K 9/61 |
| 11,181,680 | B1* | 11/2021 | Sorensen | G02B 6/0036 |
| 2002/0001193 | A1* | 1/2002 | Osawa | F21V 19/001 362/249.14 |
| 2003/0147253 | A1* | 8/2003 | Shy | B60R 1/1207 362/540 |
| 2010/0220497 | A1* | 9/2010 | Ngai | G02B 6/0068 362/610 |
| 2012/0218775 | A1* | 8/2012 | Nakada | F21S 43/14 362/602 |

(Continued)

FOREIGN PATENT DOCUMENTS

| | | |
|---|---|---|
| CN | 106885186 A | 6/2017 |
| CN | 207569721 U | 7/2018 |
| CN | 113154304 A | 7/2021 |

(Continued)

*Primary Examiner* — Arman B Fallahkhair
(74) *Attorney, Agent, or Firm* — CKC & Partners Co., LLC

(57) ABSTRACT

The present disclosure provides a lamp and a lamp system. The lamp includes two opposing side covers, a light guide plate, at least one light source and an electrical connecting assembly. The light guide plate has a light incident surface and a light emitting surface connected to the light incident surface, and the light emitting surface of the light guide plate is a curved surface. The light source is disposed in one of the side frames, and the light source is disposed near the light incident surface of the light guide plate. The electrical connecting assembly is connected to the light source to form an electrical loop.

8 Claims, 10 Drawing Sheets

(56) References Cited

U.S. PATENT DOCUMENTS

2018/0341058 A1\* 11/2018 Grigore ................ F21V 15/015
2019/0196082 A1\* 6/2019 Jeong ................... G02B 6/0065

FOREIGN PATENT DOCUMENTS

| TW | 201115194 A | 5/2011 |
|----|-------------|--------|
| TW | 202014637 A | 4/2020 |
| WO | 2019037080 A1 | 2/2019 |
| WO | 2020073318 A1 | 4/2020 |

\* cited by examiner

LAMP AND LAMP SYSTEM

RELATED APPLICATIONS

This application is a continuation application of International Application No. PCT/CN2021/124966 filed on Oct. 20, 2021, which is incorporated herein by reference.

BACKGROUND

Field of Invention

The present disclosure relates to a light emitting device. More particularly, present disclosure relates to a lamp and a lamp system.

Description of Related Art

In respond to demand of market, variation of lamps is more and more various. There is a pendent transparent lamp being able to produce light and have a nice appearance simultaneously.

However, when plural lamps are required to be connected to each other in series, and the lamp cannot be connected in series to form a continuous shape since of limitation of a frame design of the lamps, resulting in a problem that a light emitting surface of the lamp system is not continuous after connected to each other in series, a beauty of an appearance is not uniform, and a local dark region is easier to happen.

Particularly, the pendent lamps at different levels cannot be connected to each other, and cannot produce a continuous undulating light emitting surface.

SUMMARY

Accordingly, an objective of the present disclosure is to provide a lamp which has a curved surface illuminating function, and through the lamp connected to each other in series or the other panel lamp connected to each other in series, a lamp system can be changed into different shapes of appearance, the lamp system can also form a height difference in at least one direction, such that the lamp system can be applied in environment illuminating with different height variations in the aforementioned direction.

According to the aforementioned objectives of the present disclosure, a lamp is provided. The lamp includes two side covers opposite to each other, a light guide plate, at least one light source and an electrical connecting assembly. The light guide plate is carried on the side covers, in which the light guide plate has a light incident surface and a light emitting surface connected to the light incident surface, and the light emitting surface of the light guide plate is a curved surface. The light source is disposed in at least one of the side covers, and the light source is disposed near the light incident surface of the light guide plate. The electrical connecting assembly forms an electric loop with the light source.

According to the aforementioned embodiment of the present disclosure, the aforementioned lamp further includes a carrier disposed on the side covers, in which there is a distance between the carrier and the light guide plate, and the electrical connecting assembly is disposed on the carrier.

According to the aforementioned embodiment of the present disclosure, a separating element is disposed on each of the side covers, and the separating element separates the side cover into an upper space and a lower space. A part of the light guide plate is positioned in the lower space, and the carrier is positioned in the upper space, so as to form the distance between the light guide plate and the carrier.

According to one embodiment of the present disclosure, the aforementioned electrical connecting assembly includes a first connector and a second connector respectively disposed at two sides of the carrier opposite to each other, in which a first engaging direction of the first connector and a second engaging direction of the second connector respectively form an angle with a Z axis, in which at least one of the angles is not equal to 90 degrees.

According to one embodiment of the present disclosure, the aforementioned first engaging direction is different from the second engaging direction.

According to one embodiment of the present disclosure, the aforementioned carrier includes a carrying board and two connecting walls. The carrying board has two lateral sides opposite to each other and two curved sides opposite to each other, in which a radian of the curved sides is equal to a radian of the curved surface. The connecting walls are respectively erected on the lateral sides.

According to one embodiment of the present disclosure, the aforementioned electrical connecting assembly includes a first connector and a second connector, in which the first connector and the second connector are respectively disposed on the connecting walls.

According to one embodiment of the present disclosure, the aforementioned connecting walls are respectively planes, and there is an angle between the connecting walls.

According to one embodiment of the present disclosure, each of the aforementioned side covers is a curved side cover, and a radian of the curved side cover is equal to a radian of the light emitting surface.

According to one embodiment of the present disclosure, a lamp system is provided. The lamp system includes the aforementioned lamps as a first lamp and a second lamp. The first lamp and the second lamp are connected to each other through the electrical connecting assembly. A first light emitting direction of the first lamp is different from a second light emitting direction of the second lamp.

According to one embodiment of the present disclosure, the aforementioned light guide plate of the first lamp and another light guide plate of the second lamp continuously engage with each other to form a continuous light emitting surface.

According to one embodiment of the present disclosure, the aforementioned first lamp further includes a carrier disposed on the side covers, in which there is a distance between the carrier and the light guide plate, and the electrical connecting assembly is disposed on the carrier.

According to one embodiment of the present disclosure, the aforementioned electrical connecting assembly includes a first connector and a second connector respectively disposed at two sides of the carrier opposite to each other, in which a first engaging direction of the first connector and a second engaging direction of the second connector respectively form an angle with a Z axis, in which at least one of the angles is not equal to 90 degrees.

According to one embodiment of the present disclosure, the aforementioned first engaging direction is different from the second engaging direction.

According to one embodiment of the present disclosure, the aforementioned carrier includes a carrying board and two connecting walls. The carrying board has two lateral sides opposite to each other and two curved sides opposite to each other, in which a radian of the curved sides is equal to a radian of the curved surface. The connecting walls are respectively erected on the lateral sides.

According to one embodiment of the present disclosure, the aforementioned electrical connecting assembly includes a first connector and a second connector, in which the first connector and the second connector are respectively disposed on the connecting walls.

According to one embodiment of the present disclosure, the aforementioned connecting walls are respectively planes, and there is an angle between the connecting walls.

According to one embodiment of the present disclosure, each of the aforementioned side covers is a curved side cover, a radian of the curved side cover is equal to a radian of the light emitting surface, and the side cover forms a continuous frame structure with the side covers opposite to each other of the second lamps.

According to the aforementioned embodiment of the present disclosure, the lamp of the present disclosure mainly uses side covers to integrate the electrical connecting assembly, the light source and the light guide plate with a curved surface into a lamp which has simple structure and can be quickly assembled. Therefore, a combination of the lamps and panel lamps can be used to form various lamp systems with appearance having different radians and various height differences.

BRIEF DESCRIPTION OF THE DRAWINGS

To illustrate more clearly the aforementioned and the other objectives, features, merits, and embodiments of the present invention, the description of the accompanying figures are as follows.

DETAILED DESCRIPTION

Figure 1:
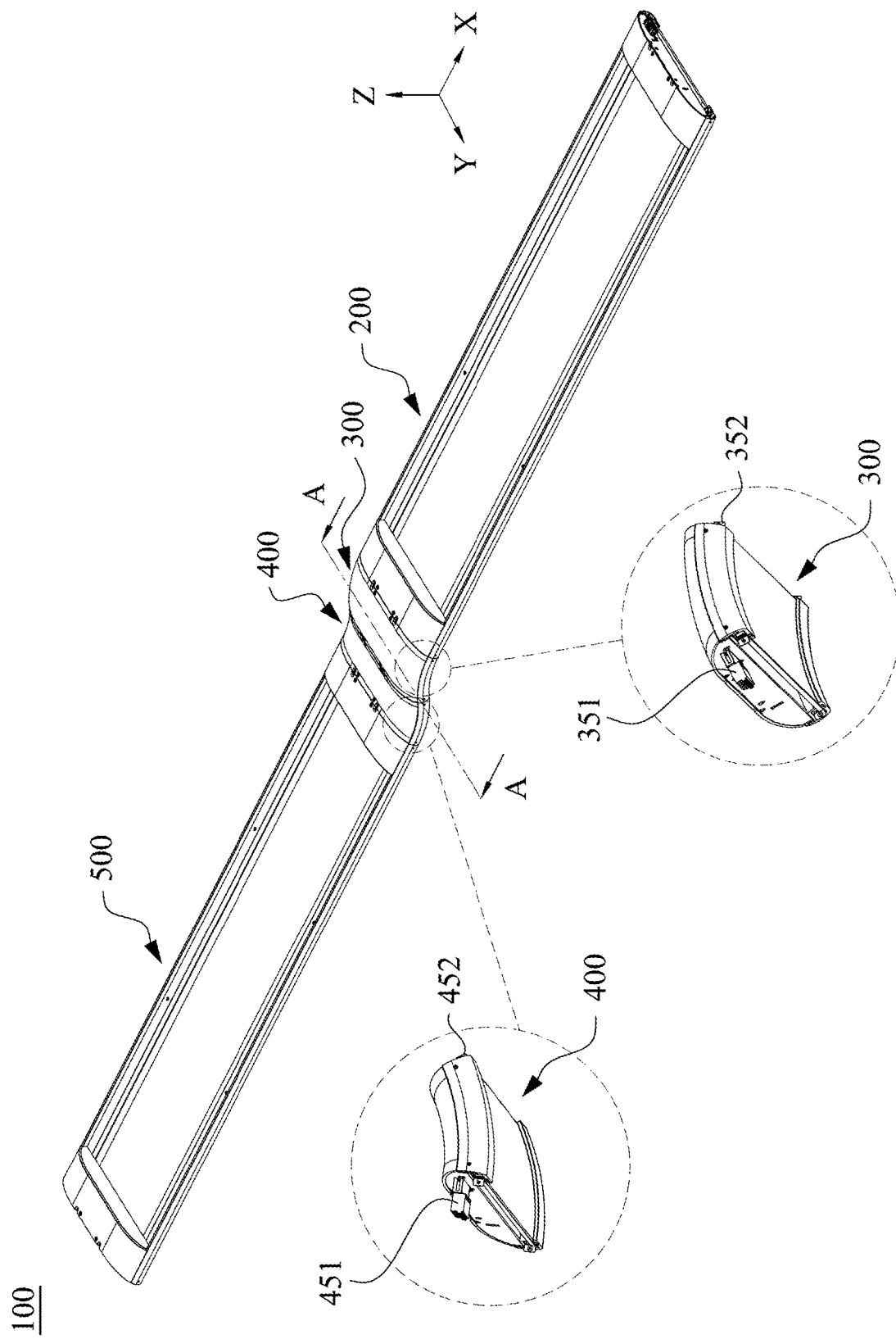
FIG. 1 illustrates a simulation diagram of a lamp system in accordance with one embodiment of the present disclosure.

Referring to FIG. 1, FIG. 1 illustrates a simulation diagram of a lamp system in accordance with one embodiment of the present disclosure. The lamp system of the present disclosure is mainly formed by connecting at least two lamps to each other in series. Taking a lamp system 100 as an example to explain. As shown in FIG. 1, the lamp system 100 of the present disclosure is formed by connecting a lamp 200, a lamp 300, a lamp 400, and a lamp 500 to each other in series. The lamp 200 and the lamp 500 are substantially the same panel lamp in view of the structure. The lamp 300 and the lamp 400 not only have illuminating function, but also can be used as turning lamps for connecting. In an embodiment, the lamp 300 is a concave down lamp, and the lamp 400 is a concave up lamp. Therefore, through disposing the turning lamp between plural panel lamps or connecting plural turning lamps to each other, the lamp system with different radians and a continuous illuminating surface can be formed.

Figure 2A:
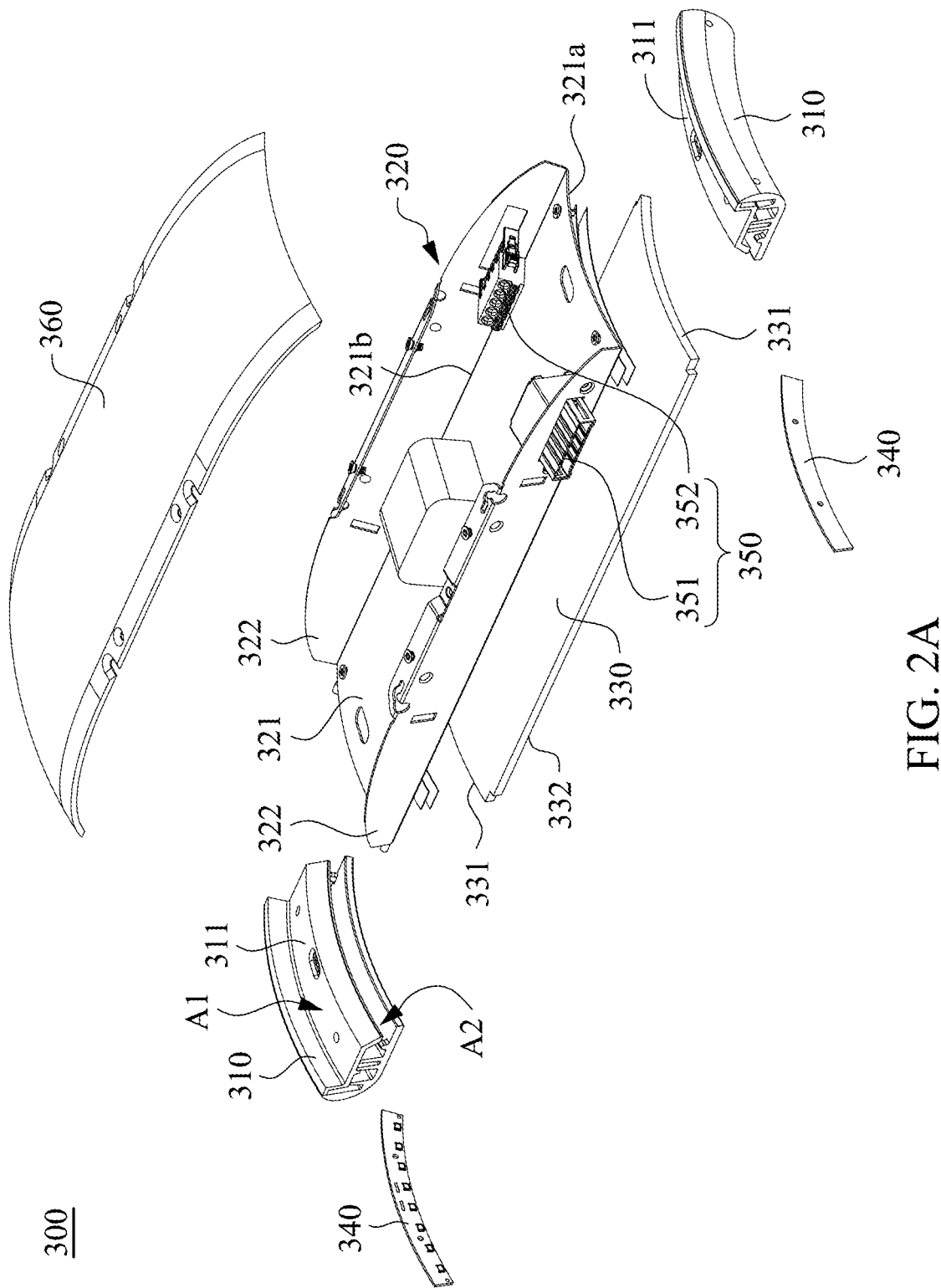
FIG. 2A illustrates an exploded view of a lamp in accordance with the first embodiment of the present disclosure.
Figure 2B:
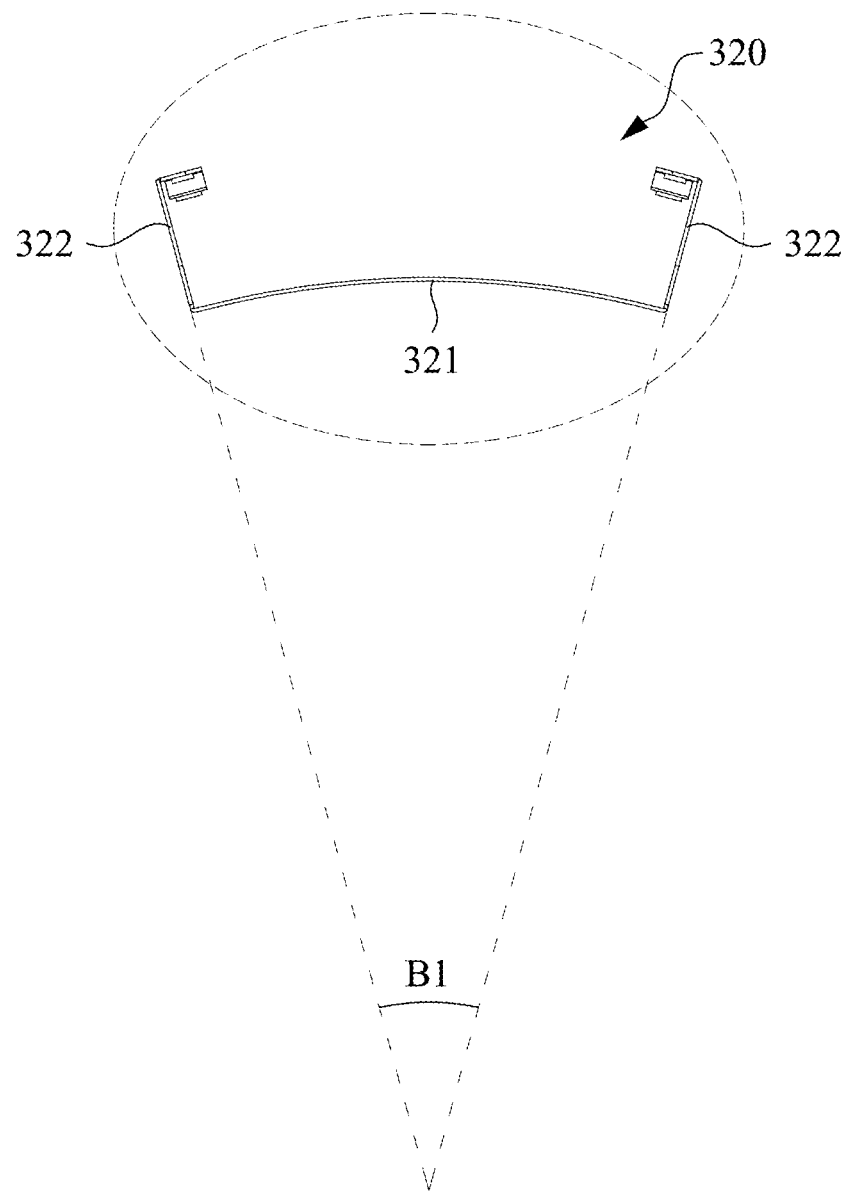
FIG. 2B illustrates a side view of a carrier in accordance with the first embodiment of the present disclosure.

Referring to FIG. 2A and FIG. 2B simultaneously, FIG. 2A illustrates an exploded view of a lamp in accordance with the first embodiment of the present disclosure, and FIG. 2B illustrates a side view of a carrier in accordance with the first embodiment of the present disclosure. The lamp 300 includes two side covers 310 opposite to each other, a carrier 320, a light guide plate 330, at least one light source 340, an electrical connecting assembly 350, and a top cover 360. The light guide plate 330 can mainly be carried on the side covers 310. The light source 340 is disposed inside the side covers 310 and disposed near the light guide plate 330, thereby providing light to the light guide plate 330. The carrier 320 is disposed on the side covers 310, and the electrical connecting assembly 350 is disposed on the carrier 320 and forms an electric loop with the light source 340. The top cover 360 covers the carrier 320 and can protect the electrical connecting assembly 350 disposed in the carrier 320, and the pendant can be disposed on the top cover 360.

Figure 3:
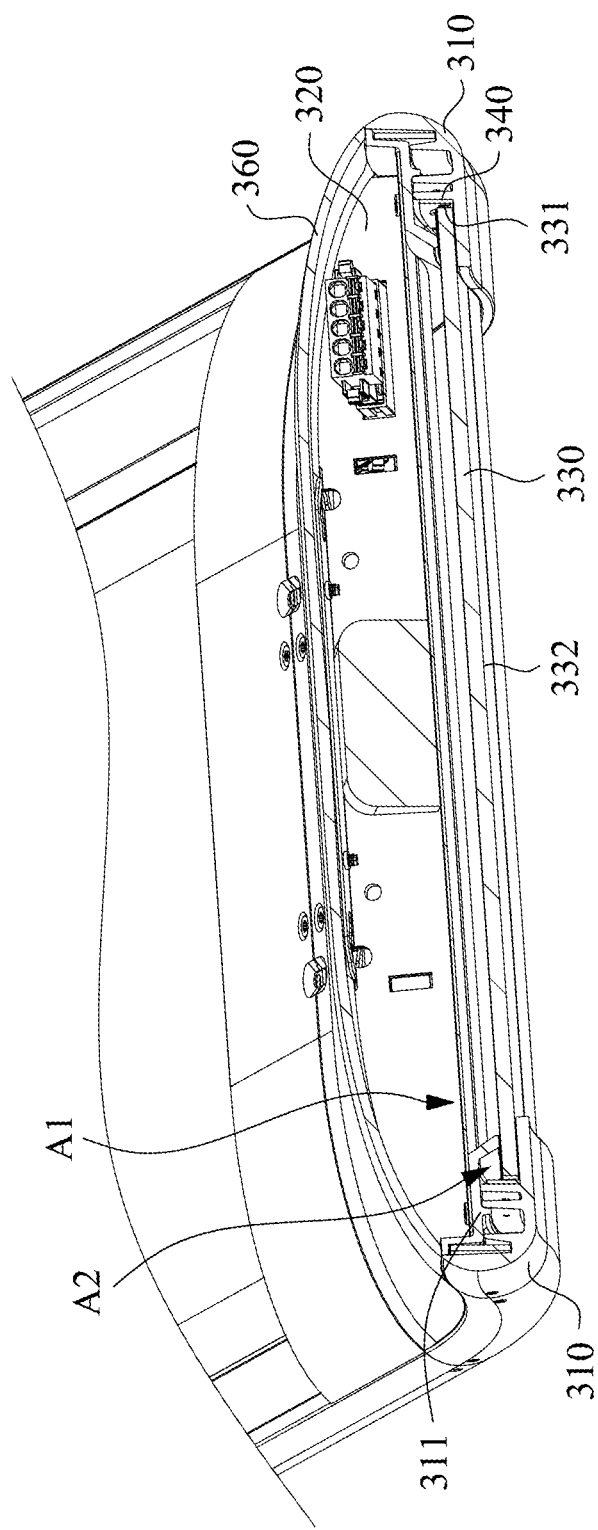
FIG. 3 illustrates a cross-sectional view taken along a line A-A of FIG. 1.

Referring to FIG. 2A and FIG. 3, FIG. 3 illustrates a cross-sectional view taken along a line A-A of FIG. 1. In an embodiment, the side cover 310 has a separating element 311, and the separating element 311 separates the side cover 310 into an upper space A1 and a lower space A2. The carrier 320 is disposed in the upper space A1. Moreover, the light guide plate 330 has a light incident surface 331 and a light emitting surface 332 connected to the light incident surface 331. The light source 340 is disposed in the lower space A2. A part of the light guide plate 330 near the light incident surface 331 is disposed in the lower space A2 and faces the light source 340. The separating element 311 can separate the carrier 320 and the light guide plate 330, and form a distance between the carrier 320 and the light guide plate 330. Therefore, using the carrier 320 disposed in the upper space A1 to accommodate the electrical connecting assembly 350 or other relevant elements required by the lamp 300 can avoid the light emitting effect of the light guide plate 330 at the lower space A2 from being influenced, and further make the light guide plate 330 look more transparent in visual effect.

In the present embodiment, the light emitting surface 332 of the light guide plate 330 is a curved surface, and the side cover 310 is a curved side cover having a curvature corresponding to the curvature of the curved surface of the light guide plate 330. In an example, the light source can be a LED stripe, and the base shape of the light source 340 can correspond to the arc of the side cover 310, so as to be put in the side cover 310. In an embodiment, the carrier 320 can be designed as a curved carrier corresponding to the radian of the curved surface of the light guide plate 330. For example, as shown in FIG. 2A and FIG. 2B, the carrier 320 looks like a concave down U shape in profile, and the carrier 320 includes a carrying board 321 and two connecting walls 322. The carrying board 321 has two curved sides 321a opposite to each other and two lateral sides 321b opposite to each other, in which a radian of the curved side 321a is the same as a radian of the light emitting surface 332 of the light guide plate 330, the connecting walls 322 are respectively erected on the lateral sides 321b without curvature. In an embodiment, the connecting walls 322 are planes which are good to engage with the connecting wall of the next lamp and have an angle B1 between two connecting walls 322 opposite to each other. That is, the connecting walls 322 are inclined relative to the carrying board 321 with an angle and are not parallel to each other.

Figure 4:
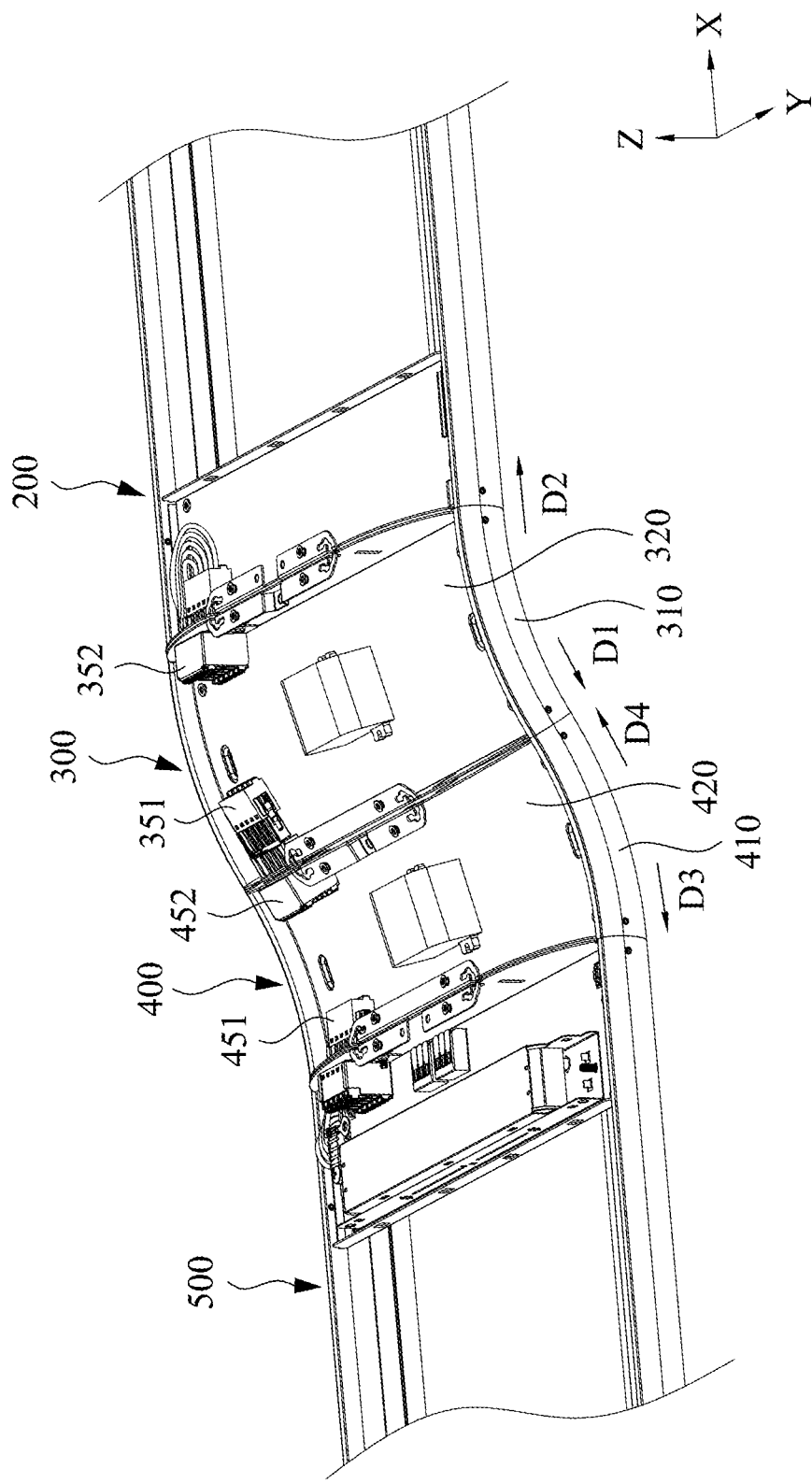
FIG. 4 illustrates a local schematic diagram of the lamp in connected state as shown in FIG. 1.

Referring to FIG. 2A and FIG. 4, FIG. 4 illustrates a local schematic diagram of the lamp in connected state as shown in FIG. 1. In the present embodiment, the electrical connecting assembly 350 includes a first connector 351 and a second connector 352 respectively disposed at two sides of the carrier 320 opposite to each other, and the first connector 351 and a second connector 352 can be electrically connected to each other through, for example, loops (not shown in figure). At least one of a first engaging direction D1 of the first connector 351 and a second engaging direction D2 of the second connector 352 is designed to be not vertical to a Z axis and forms an angle with the Z axis. In the present disclosure, the Z axis is defined to be a direction vertical to the ceiling (or pendant plane of the lamp), that is, when the panel lamp (for example, the lamp 200 and the lamp 500 as shown in FIG. 1) is disposed horizontally, the axis vertical to the light emitting surface of the panel lamp is the Z axis. In an example, the first connector 351 of the lamp 350 and the second connector 352 of the lamp 350 are respectively disposed on two connecting walls 322 opposite to each other of the carrier 320, and the first engaging direction D1 of the first connector 351 is different from the second engaging direction D2 of the second connector 352, therefore an extending direction (or a light emitting direction) of the lamp 400 engaging with the first connector 351 of the lamp 300 is naturally different from the extending direction (or the light emitting direction) of the lamp 200 engaging with the second connector 352.

Figure 5A:
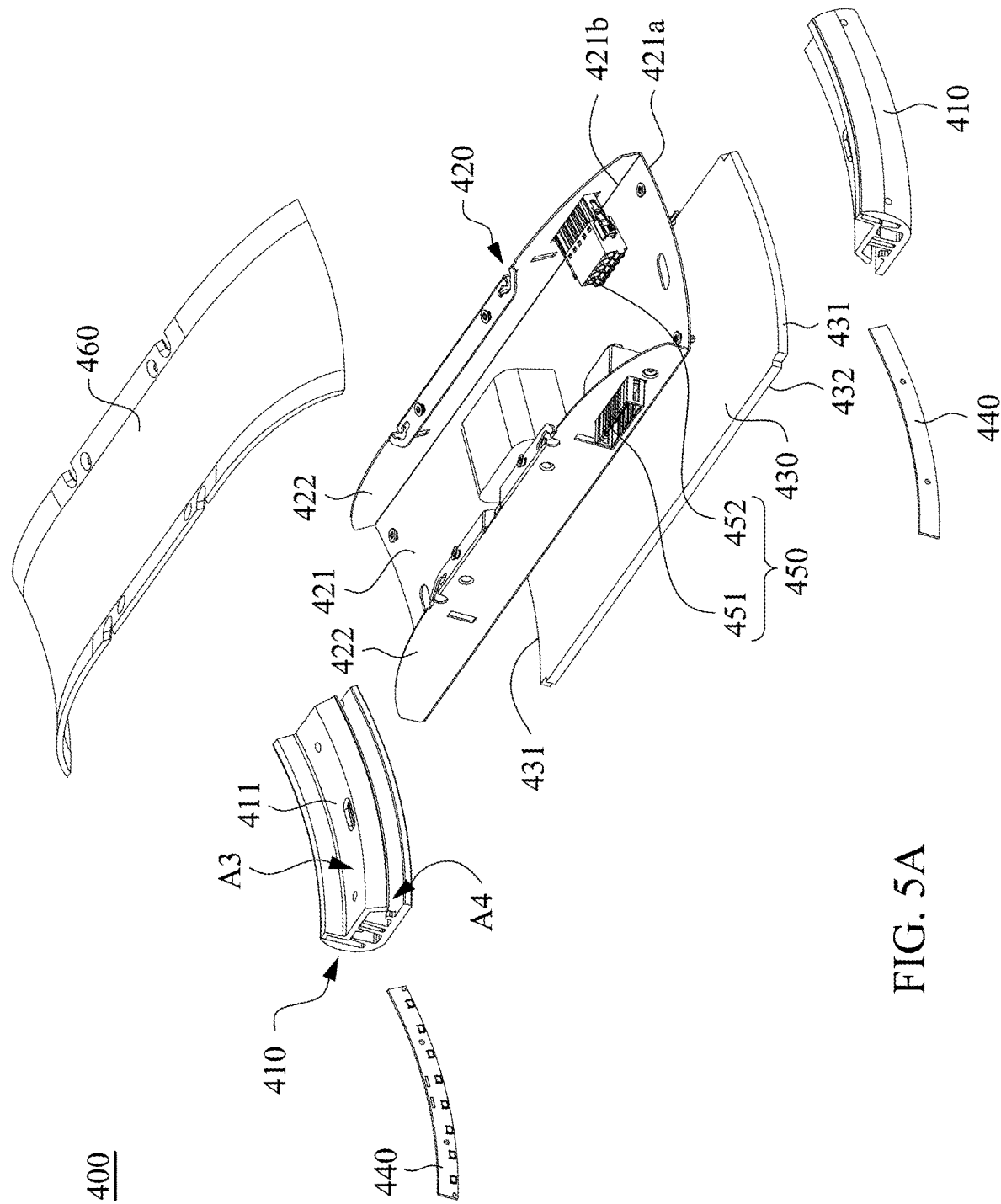
FIG. 5A illustrates an exploded view of a lamp in accordance with the second embodiment of the present disclosure.
Figure 5B:
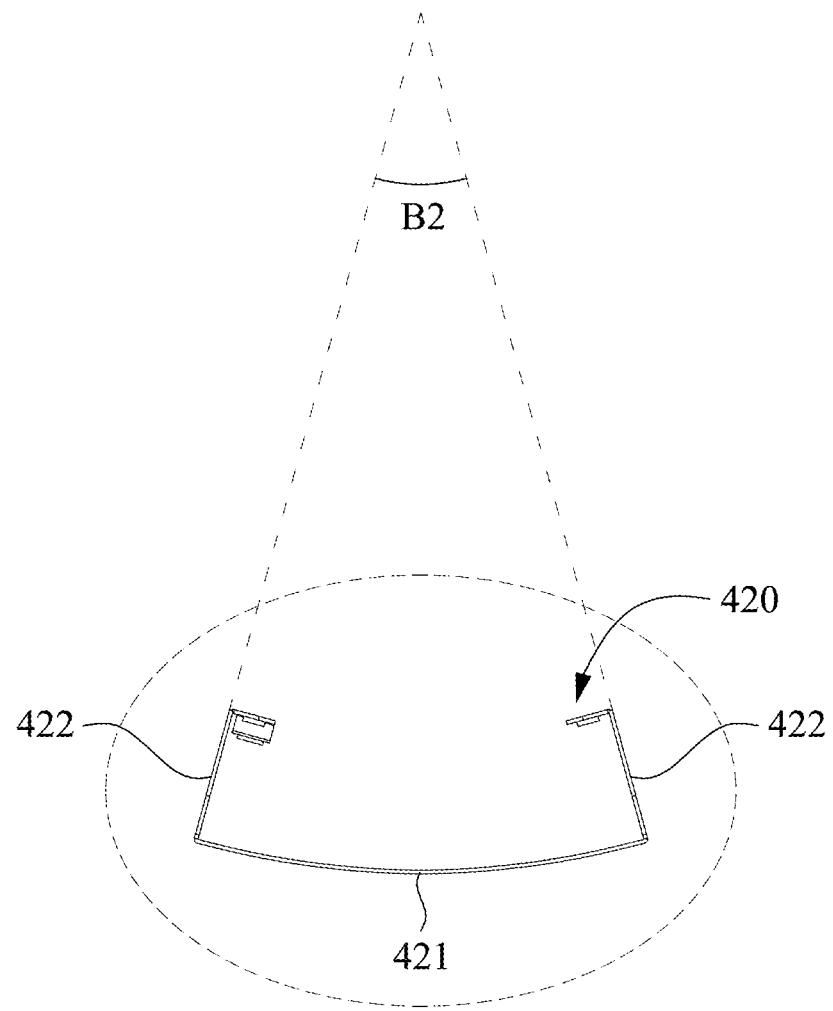
FIG. 5B illustrates a side view of a carrier in accordance with the second embodiment of the present disclosure.

Referring to FIG. 1, FIG. 5A, and FIG. 5B, FIG. 5A illustrates an exploded view of a lamp in accordance with the second embodiment of the present disclosure, and FIG. 5B illustrates a side view of a carrier in accordance with the second embodiment of the present disclosure. The lamp 400 includes two side covers 410 disposed opposite to each other, a carrier 420, a light guide plate 430, at least one light source 440, an electrical connecting assembly 450, and a top cover 460. The light guide plate 430 is carried on the side covers 410. The light source 440 is disposed inside the side covers 410, thereby providing light into the light guide plate 430. The carrier 420 is disposed on the side covers 410, and the electrical connecting assembly 450 is disposed on the carrier 420 and forms the electric loop with the light source 440. The top cover is disposed on the carrier 420, which can protect the electrical connecting assembly 450 disposed in the carrier 420, and can be used for a pendant line disposed thereon.

Referring to FIG. 5A, in the present embodiment, a separating element 411 is disposed on the side cover 410, and the separating element 411 separates the side cover 410 into an upper space A3 and a lower space A4. The carrier 420 is disposed in the upper surface A3. Moreover, the light guide plate 430 has a light incident surface 431 and a light emitting surface 432 connected to the light incident surface 431. The light source 440 is disposed in the lower space A4, and a part of the light guide plate 430 near the light incident surface 431 is also disposed in the lower space A2 and faces the light source 440. That is, through separating the carrier 420 and the light guide plate 430 by the separating element 411, a distance can be formed between the carrier 420 and the light guide plate 430. Therefore, using the carrier 420 disposed in the upper space A3 to accommodate the electrical connecting assembly 450 or other relevant elements required by the lamp 400 can avoid the light emitting effect of the light guide plate 430 at the lower space A4 from being influenced, and further make the light guide plate 430 look more transparent in visual effect.

In the present embodiment, the light emitting surface 432 of the light guide plate 430 is a curved surface, and the side cover 410 is a curved cover corresponding to the radian of the curved surface of the light guide plate 430. Therefore, when the lamp 400 having the curved design and the lamp 300 having the curved design are connected to each other in series, the side cover 410 of the lamp 400 and the side cover 310 of the lamp 300 can form a continuous frame structure, and the light guide plate 430 of the lamp 400 and the light guide plate 330 of the lamp 300 can be engaged with each other and form a continuous light emitting surface. As shown in FIG. 5A and FIG. 5B, the carrier 420 looks like a concave up U shape viewing from the side, and the carrier 420 includes a carrying board 421 and two connecting walls 422. The carrying board 421 has two curved sides 421a opposite to each other and two lateral sides 421b opposite to each other, in which a radian of the curved side 421a is the same as a radian of the light emitting surface 432 of the light guide plate 430, and the connecting walls 422 are respectively erected on the lateral sides 421b without radian. In an embodiment, the connecting walls 422 are planes which are good to engage with the connecting wall of the next lamp and have an angle B2 between the two connecting walls 422 opposite to each other. That is, the connecting walls 422 are inclined relative to the carrying board 421 with an angle and are not parallel to each other.

Referring to FIG. 4 and FIG. 5, in the present embodiment, the electrical connecting assembly 450 includes a first connector 451 and a second connector 452 respectively disposed at two sides of the carrier 420 opposite to each other. At least one of a first engaging direction D3 of the first connector 451 and a second engaging direction D4 of the second connector 452 is designed to be not vertical to a Z axis and forms an angle with the Z axis. In the present embodiment, the first connector 451 of the lamp 400 and the second connector 452 of the lamp 400 are respectively disposed on the two connecting walls 422 opposite to each other of the carrier 420, that is, the first connector 451 and the second connector 452 are respectively disposed for engaging with other electric connectors of other lamps, and the first engaging direction D3 of the first connector 451 is different from the second engaging direction D4 of the second connector 452. Therefore, as shown in FIG. 4, through engaging the lamp 300 with the lamp 400 directly, a lamp appearance with radian can be formed. Moreover, combining the panel lamps, for example, the lamp 200 and the lamp 500, with the lamp 300 and the lamp 400 respectively, the Z-shaped lamp system 100 as shown in FIG. 1 can be formed. Besides, engaging the lamp 300 and the lamp 400 having a height difference with each other in Z axis with the lamp 200 and the lamp 500, the lamp 200 and the lamp 500 can be located in different height levels, and can provide an environment illuminating adjusting to various height differences in Z axis. In another example, when engaging the panel lamp 200 and the panel lamp 500 respectively with the lamp 300 and the lamp 400, since the light incident surfaces of the lamp 300 and the lamp 400 are respectively inclined to the Z axis and form angles not equal to 90 degrees to the Z axis respectively, therefore a height difference between the panel lamp 200 and the panel lamp 500 can be formed.

Specifically speaking, the lamp system of the present disclosure disposing at least one lamp with curved surface between two panel lamps, and two engaging directions between the lamp with curved surface and two panel lamps are misalign to each other, for example, the misalignment is in Z axis in the present embodiment. As shown in FIG. 4, the second engaging direction D2 of the second connector 352 of the lamp 300 can be designed to not coincide with the first engaging direction D3 of the first connector 451 of the lamp 400, hence the environment illuminating with various height difference in Z axis can be produced between two panel lamps. In the embodiment as shown in FIG. 4, the lamp 300 having a single curved surface and the lamp 400 having a single curved surface engage with each other to form a light emitting effect of plural curved surfaces. In other embodiment, the lamp 300 and the lamp 400 can be replaced with a lamp having plural curved surfaces and also can achieve the aforementioned environment illuminating adjusting various height differences in Z axis.

Figure 6:
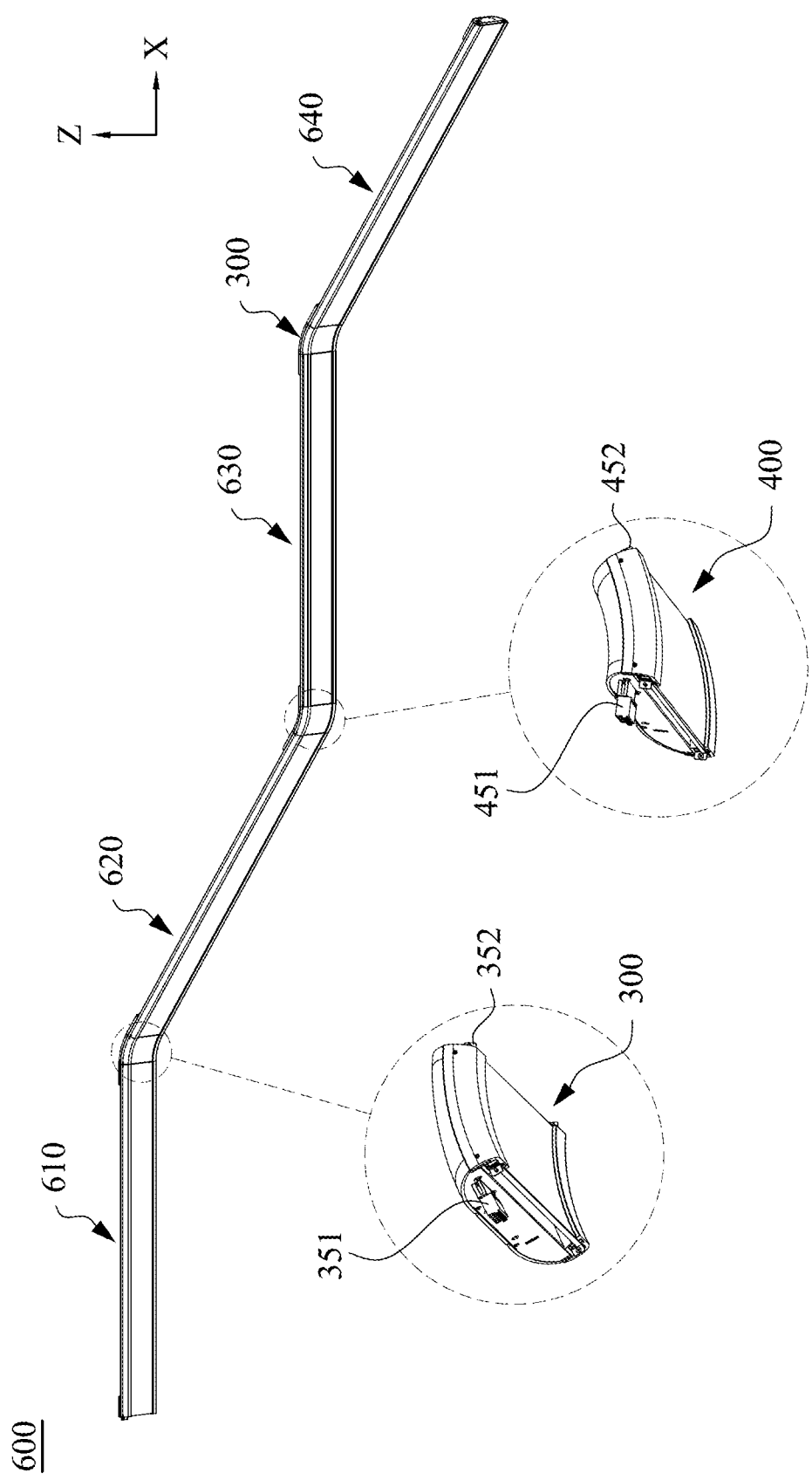
FIG. 6 and FIG. 7 respectively illustrate schematic diagrams of a lamp system which can be applied in stairs situation.
Figure 7:
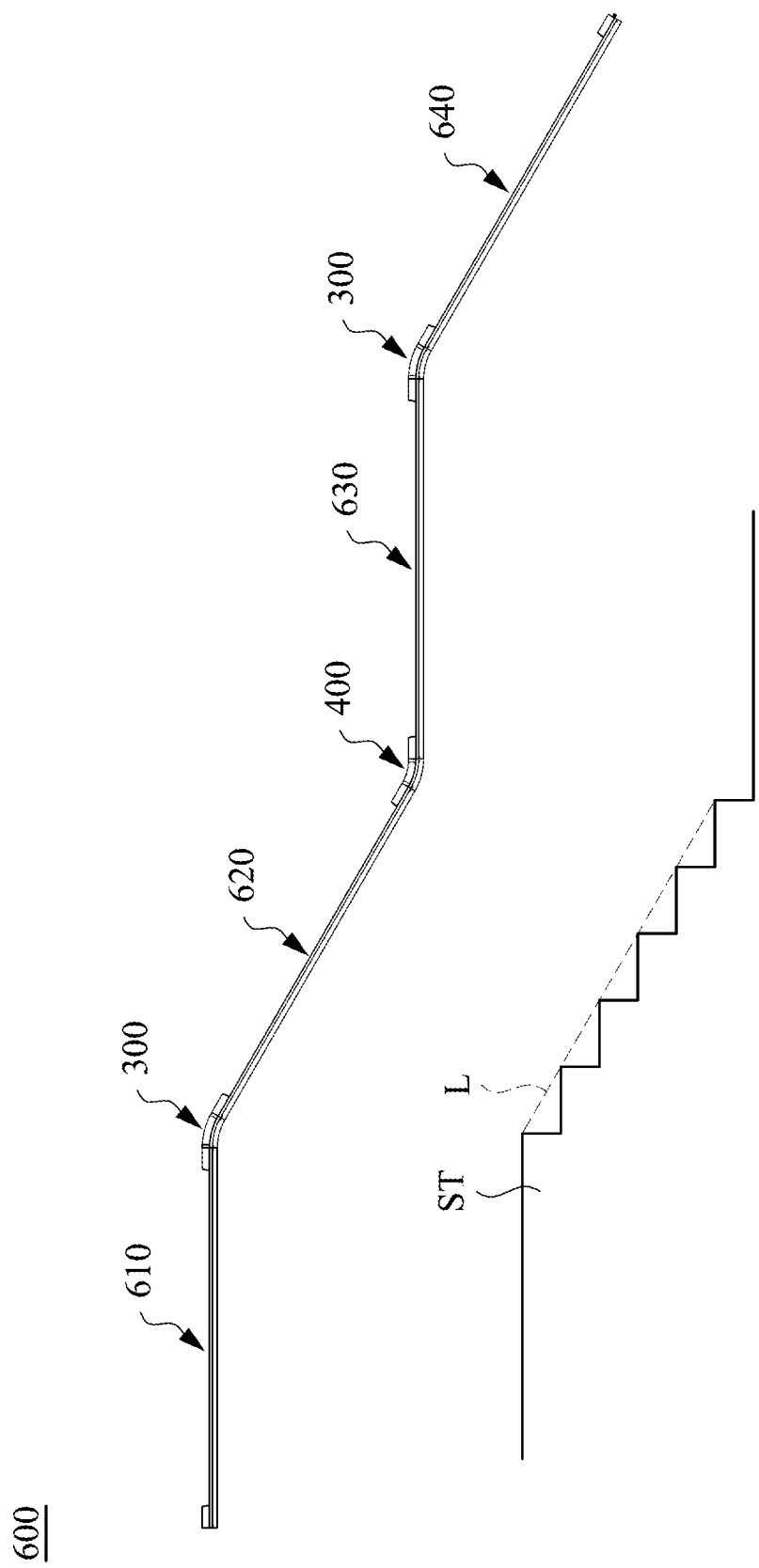

According to the aforementioned description, when the disposed position of the lamp and the illuminating direction of the lamp are required to be changed, a combination of the lamp 300, the lamp 400 and a normal panel lamp can be used to form the required shape of lamp and further be applied in various environments. For example, as shown in FIG. 6 and FIG. 7, FIG. 6 and FIG. 7 respectively illustrate schematic diagrams of a lamp system which can be applied in stairs situation. A lamp system of the present disclosure is mainly formed by connecting a lamp 610, a lamp 300, a lamp 620, a lamp 400, a lamp 630, a lamp 300 and a lamp 640 in series. The lamp 610, the lamp 620, the lamp 630 and the lamp 640 are substantially the same panel lamps. As shown in FIG. 6 and FIG. 7, the concave down lamp 300 and the concave up lamp 400 can be used to change the extending direction between panel lamps. For example, after installing the lamp 610 placed horizontally, the first connector 351 of the lamp 300 can be connected to the lamp 610 and the lamp 620 can be connected to the second connector 352 of the lamp 300. Since the engaging direction of the first connector 351 of the lamp 300 is different from the engaging direction of the second connector 352 of the lamp 300, and the lamp 300 has a concave down arc design, the lamp 620 is inclined downward relative to the lamp 610. Identically, if the lamp 400 is connected to the lamp in series 620, and the lamp 630 is connected to the lamp 400 afterwards, since the engaging direction of the first connector 451 of the lamp 400 is different from the engaging direction of the second connector 452 of the lamp 400 and the lamp 400 has a concave up arc design, the lamp 630 is not disposed obliquely anymore, but is disposed horizontally as the lamp 610, thereby making the entire lamp system 600 have an appearance look like undulating stair.

In an applying example, the lamp system 600 can be applied to the illuminating of a slope or a stair ST environment, and the number of panel lamps (for example, the lamp 610, the lamp 620 and the lamp 630) and curved surface lamps (for example, the lamp 300 and the lamp 400) in series in the lamp system 600 and the connecting way of panel lamps and curved surface lamps in the lamp system 600 can depend on a length of the stair ST or the length of the slope and a sloping rate of the slope. In an embodiment, vertexes of plural steps of the stair ST can collectively form a connecting line L, and a connecting direction of plural lamps corresponds to the extending direction of the connecting line L of the vertexes of plural steps or the sloping rate of the connecting line L of the vertexes of plural steps, thereby making the lamp system 600 be able to adjust undulation of height of the slope or the stair environment, and behaving better illuminating effect.

Figure 8:
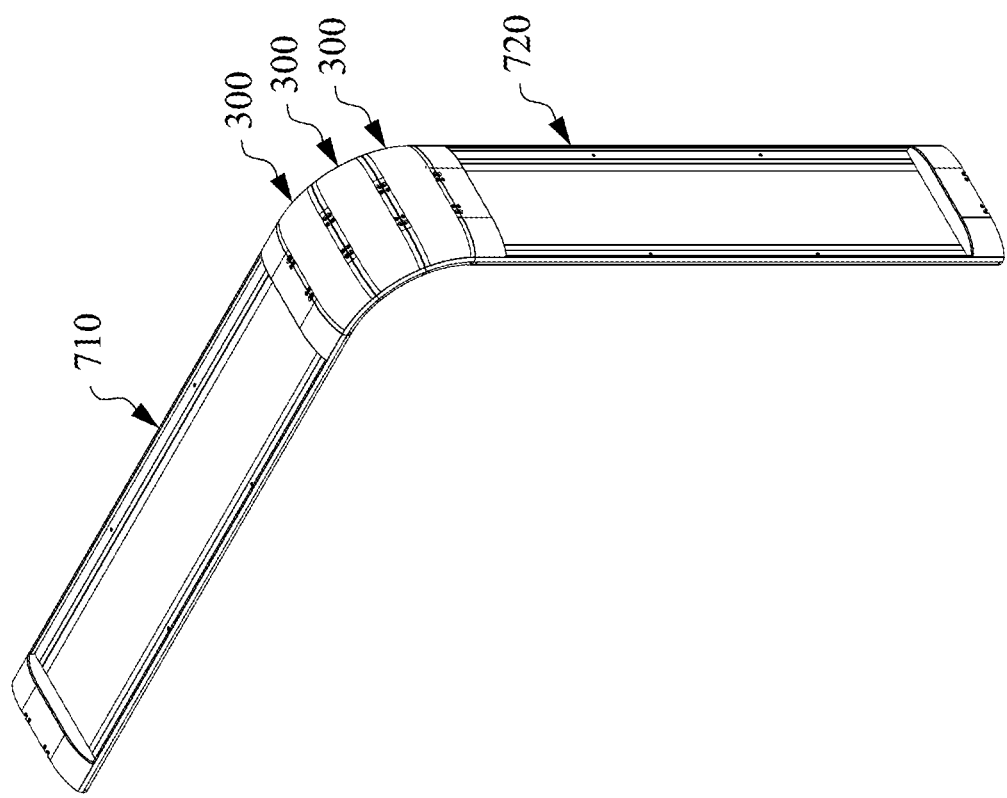
FIG. 8 illustrates a schematic diagram of a lamp system in accordance with another embodiment of the present disclosure.

Referring to FIG. 8, FIG. 8 illustrates a schematic diagram of a lamp system in accordance with another embodiment of the present disclosure. In the present embodiment, a lamp system includes a lamp 710, a lamp 720, and three lamps 300. The lamp 710 and the lamp 720 are panel lamps, and the lamp 300 is a concave down lamp. Accordingly, through connecting three lamps 300 continuously in series between the lamp 710 and the lamp 720, the entire lamp system 700 is formed to have an L-shaped appearance, thereby applying to different situations such as an exhibition. In other examples of the present embodiment, the curved surface of the lamp can also be designed to be a part of an arc, a part of the arc can be assembled to form a circular lamp.

According to the aforementioned embodiment of the present disclosure, the lamp of the present disclosure mainly uses side covers to integrate the electrical connecting assembly, the light source and the light guide plate with a curved surface into a lamp which has simple structure and can be assembled quickly. Therefore, a combination of the lamps and panel lamps can be used to form various lamp systems with appearances having different radians and various height differences.

Although the embodiments of the present disclosure have been disclosed as above in the embodiments, they are not intended to limit the embodiments of the present disclosure. Any person having ordinary skill in the art can make various changes and modifications without departing from the spirit and the scope of the embodiments of the present disclosure. Therefore, the protection scope of the embodiments of the present disclosure should be determined according to the scope of the appended claims.

What is claimed is:

1. A lamp system comprising: a first lamp and a second lamp, at least one of the first and second lamps comprising: two side covers opposite to each other; a light guide plate carried on the side covers, wherein the light guide plate has a light incident surface and a light emitting surface connected to the light incident surface, and the light emitting surface of the light guide plate is a curved surface; at least one light source disposed in at least one of the side covers, and the light source being disposed near the light incident surface of the light guide plate; and an electrical connecting assembly forming an electric loop with the light source; wherein the first lamp and the second lamp are connected to each other through the electrical connecting assembly, wherein a first light emitting direction of the first lamp is different from a second light emitting direction of the second lamp; the light guide plate of the first lamp and another light guide plate of the second lamp continuously connect to each other to form a continuous light emitting surface; wherein each of the side covers is a curved side cover, a radian of the curved side cover is equal to a radian of the curved surface of the light emitting surface, and the side cover forms a continuous frame structure with the side covers opposite to each other of the second lamps.

2. The lamp system of claim 1 further comprising a carrier disposed on the side covers, wherein there is a distance between the carrier and the light guide plate, and the electrical connecting assembly is disposed on the carrier.

3. The lamp system of claim 2, wherein the carrier comprises:
a carrying board having two lateral sides opposite to each other and two curved sides opposite to each other, wherein a radian of the curved sides is equal to a radian of the curved surface of the light emitting surface; and
two connecting walls respectively erected on the lateral sides.

4. The lamp system of claim 3, wherein the electrical connecting assembly comprises a first connector and a second connector, and wherein the first connector and the second connector are respectively disposed on the connecting walls.

5. The lamp system of claim 3, wherein the connecting walls are respectively planes, and there is an angle between the connecting walls.

6. The lamp system of claim 2, wherein the electrical connecting assembly comprises a first connector and a second connector respectively disposed at two sides of the carrier opposite to each other, wherein a first engaging direction of the first connector and a second engaging direction of the second connector respectively form an angle with a Z axis, and wherein at least one of the angles is not equal to 90 degrees.

7. The lamp system of claim 6, wherein the first engaging direction is different from the second engaging direction.

8. The lamp system of claim 2, wherein
a separating element is disposed on each of the side covers, the separating element separates the side cover into a upper space and a lower space; and
a part of the light guide plate is positioned in the lower space, and the carrier is positioned in the upper space, so as to form the distance between the light guide plate and the carrier.

* * * * *